UNITED STATES PATENT OFFICE.

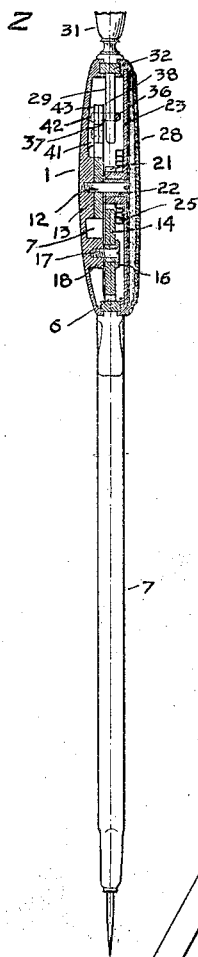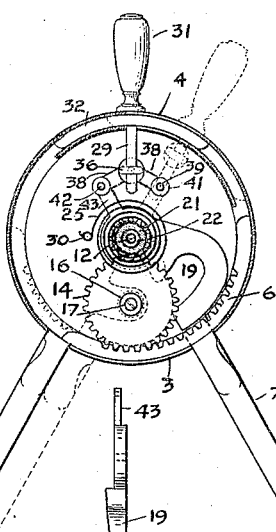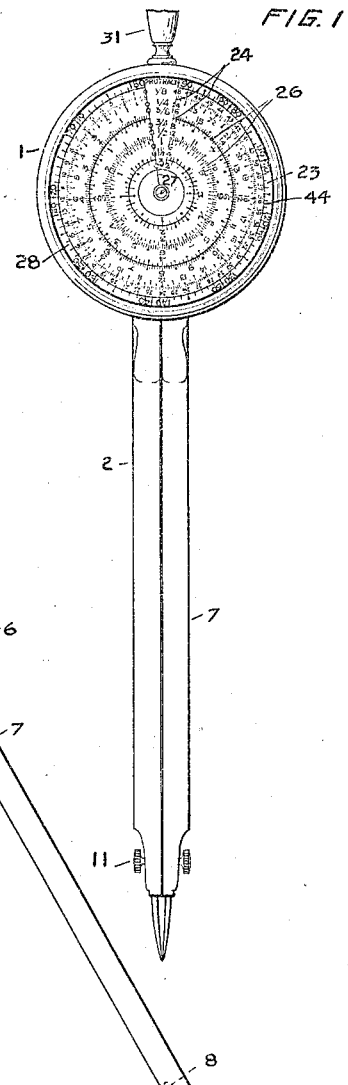

ALADAR S. HARCOS, OF SAN FRANCISCO, CALIFORNIA.

DRAWING INSTRUMENT.

1,299,179.     Specification of Letters Patent.     Patented Apr. 1, 1919.

Application filed March 26, 1918. Serial No. 224,701.

*To all whom it may concern:*

Be it known that I, ALADAR S. HARCOS, a citizen of the United States, residing at San Francisco, in the county of San Francisco and State of California, have invented new and useful Improvements in Drawing Instruments, of which the following is a specification.

Draftsmen who draw to scale use numerous scale rulers for ascertaining the lengths of lines representing, generally in a reduced proportion, the lengths of other lines on a different scale. These scales are known as, among others, a 3-inch scale, a 1½-inch scale, a 1-inch scale, a ½-inch scale, a ¾-inch scale, a ⅜-inch scale, a ¼-inch scale, and a ⅛-inch scale. Other scales are sometimes found, but the above are the ones most commonly used. Heretofore the most satisfactory embodiment of such scales was in the form of thin, flat strips of wood, or other suitable material, properly graduated for the particular scale required. Or one such ruler may carry two different scales, one on each edge. Another embodiment of these scales is that of the polyhedral ruler, having two scales marked on each edge. But all such scales are inconvenient and their use involves consumption of time in turning from one scale to the other. Moreover, such scales require the marking of the paper as by pricking the same, to be done in a separate operation.

One object of the invention is to provide a single instrument which can be used in a single operation to mark, by pricking the same on the paper, an interval corresponding to any one desired of a large number of scales.

A further object is to provide an instrument which can be used with great convenience as an ordinary divider.

A further object is to provide an instrument which, when used as a proportional divider, will be much more convenient than proportional dividers at present in use.

A further object is to provide an instrument which can be used very conveniently as a protractor.

In the accompanying drawing, Figure 1 is a broken front view of my improved instrument; Fig. 2 is a longitudinal, central sectional view thereof; Fig. 3 is a broken front view of the instrument, the indicating dial being removed; Fig. 4 being a front view of one of the legs of the instrument, detached.

Referring to the drawing, 1 indicates a stationary circular case having integrally connected therewith one end of a leg 2. In diametrically opposite portions of the circumference of the case 1 are slots 3 and 4. The slot 3 is always closed by the outer edge of a curved rack 6 which oscillates in close contact with the circumferential portion of the case 1. Through said rack, and also through the slot 3, extends a movable leg 7. Said legs 2 and 7 are formed at their free ends with recesses 8 to receive pins 9 adjustably secured by set screws 11. The inner end of the leg 7 is rotatably mounted upon a shaft 12, screwed into a central boss 13 extending inwardly from the inner surface of the case 1. When said leg 7 is oscillated about said shaft 12 it carries with it the curved rack 6, thereby rotating an idler gear wheel 14, meshing with said rack and mounted upon a hub 16 secured by a screw 17 to a boss 18 extending inwardly from the inner surface of said case 1. The portion of the leg 7 which is contained within the casing 1 is recessed, as shown at 19, to enable it to pass on each side of said hub 16. The rotation of the idler gear wheel 14 rotates a pinion 21 which rotatably surrounds a hub 22 secured around the shaft 12. Said pinion is formed integral with a dial 23, and therefore the dial rotates with the leg 7, but at a greater angular speed. The parts are of such proportions that, when the leg 7 is moved through the full length of the slot 3, and the dial 23 makes nearly a complete revolution, so that the ends 24 of concentric circular scale lines 26 coincide with a radially extending hair line 27 marked on a stationary crystal 28 secured in the case 1, with which hair line the beginnings of the circular scale lines 26 coincide or register when the legs 2 and 7 are close together, as shown in Fig. 1. There may be any number of such circular scale lines but only four are here shown. However, by using graduations on both sides of each scale line, eight scales are obtained, the scales shown in the accompanying drawing being those of 3 inches, 1½-inch, 1-inch, ½-inch, ¾-inch, ⅜-inch, ¼-inch and ⅛-inch.

Supposing that a draftsman desires to mark on a sheet of paper the ends of a line representing 5 feet on a scale of ⅜-inch to the foot. Observing the scale of ⅜-inch he draws the legs of the instrument apart until the graduation mark 5 is directly underneath the hair line on the crystal. Then the pin points of the instrument will be at the proper distance apart to prick on the paper the ends of the line corresponding to five feet on the scale of ⅜-inch to the foot. The other scales are used in precisely the same manner.

With the construction as heretofore described there would often be some inaccuracy in the operation of the instrument due to the lost motion between the teeth of the idler gear wheel and those of either the pinion or the rack. In order to avoid this lost motion I provide a spiral spring 25, which surrounds the hub of the pinion, of which one end is secured to the pinion and the other is passed through a hole in a boss 30 extending inwardly from the inner surface of the case 1. This spring is at all times under tension and serves to maintain the forward portion of a driving tooth of the idler wheel or rack in contact with a rear portion of a driven tooth of the pinion or idler wheel respectively and also operates in like manner in regard to the tooth of the rack and idler wheel. It is evident that by this means all lost motion, and inaccuracy due to that cause, are eliminated.

Through the other arcuate slot 4 extends the stem 29 of a handle 31, there being secured to said stem an arcuate guide piece 32 which oscillates in said slot and serves as a cover for the slot, its edges moving in grooves 33 in the case 1 on opposite sides of said slot. Said stem 29 extends through a ring 36 formed with a stem 37 which extends through adjacent ends of arms 38, of which the other end of one is pivoted, as shown at 39, to a boss 41 extending inwardly from the inner surface of the case, and the other end of the other is pivoted, as shown at 42, to an extension 43 of the leg 7 beyond the shaft 12 on which it is pivoted. The boss 41 is colinear with the shaft 12 and the inner surface of the leg 2; and, consequently, by the arrangement just above described, the stem 29 is always maintained midway between the two legs, that is to say, in such a position that, if it were extended, it would pass through the shaft 12 in a direction bisecting the angle between the two legs.

It is of course necessary that the distance of the boss 41 from the pivot 12 be the same as the length of the extension 43 beyond its pivot; and that the two arms 38 are likewise equal. The boss 41 rigidly extending from the case 1 which is rigid with the leg 2 may be considered as an extension of said leg.

To use the instrument as a divider the legs are spread apart and used in the same manner as those of an ordinary divider.

To use the instrument as a proportional divider the legs are spread apart until the points are at the ends of the line of which it is desired to ascertain a given fraction or multiple, and note is made of the graduation mark immediately beneath the hair line 27 on some given scale, as for instance, the scale 1. Attention is then directed to a scale which is indicated by a number which is the same fraction or multiple of 1 as that to which the lines are to be reduced or enlarged, and the legs of the instrument are then moved into such a position that the number before noted appears immediately beneath the hair line of said latter scale. The points of the instrument will then be at the distance required. For instance, suppose it is required to mark on a sheet of paper a line one-third of another. The legs are spread apart until the distance between the points is equal to the length of the line on the original sheet and the graduation mark of the ¾-inch scale that appears immediately beneath the hair line is noted. The legs of the instrument are then moved until the same graduation mark on the scale of ¼-inch appears beneath the hair line. The distance between the points is then the distance required.

A circular scale 44 graduated to show degrees is also formed on the dial 23, and to use the instrument as a protractor, a circle is described with a 4¼-inch radius, the legs are moved apart until the required number of degrees on the scale 44 appears beneath the hair line, and then the points of the instrument are applied to the circumference of the circle. The marks then made by the points will subtend at the center of the circle the angle desired.

It is to be understood that the improvements herein described and claimed may also be applied to calipers or any other instruments for which they are appropriate.

I claim:

1. An instrument of the character described comprising legs, a pivot therefor, a circular rack having internal gear teeth and movable with one of said legs, an idler gear wheel rotatably carried by the other leg and meshing with said rack, a rotary pinion meshing with said gear wheel, an indicating dial rotatable about said pivot and adapted to rotate with said pinion and having a graduated circular line on said dial concentric with said pivot, and also having a mark fixed in relation to the other leg in proximity to which said circular line moves in its rotation.

2. An instrument of the character described comprising legs, a pivot therefor, a circular rack having internal gear teeth and movable with one of said legs, an idler gear wheel rotatably carried by the other leg and meshing with said rack, a rotary pinion meshing with said gear wheel, an indicating dial rotatable about said pivot and adapted to rotate with said pinion, and having a graduated circular line on said dial concentric with said pivot, and also having a mark fixed in relation to the other leg in proximity to which said circular line moves in its rotation, and a spring for taking up lost motion between the toothed elements.

A. S. HARCOS.

Copies of this patent may be obtained for five cents each, by addressing the "Commissioner of Patents, Washington, D. C."